United States Patent
Tull, Jr. et al.

[19]

[11] Patent Number: 6,092,056
[45] Date of Patent: *Jul. 18, 2000

[54] DATA PROCESSING SYSTEM AND METHOD FOR FINANCIAL DEBT INSTRUMENTS

[75] Inventors: Robert Stanley Tull, Jr., Levittown, Pa.; David M. Weisberger, London; John Vincent Fox, Esher, both of United Kingdom; Myriam Joelle Karsenty, New York, N.Y.

[73] Assignee: Morgan Stanley Dean Witter, New York, N.Y.

[ * ] Notice: This patent is subject to a terminal disclaimer.

[21] Appl. No.: 09/313,155

[22] Filed: May 17, 1999

Related U.S. Application Data

[63] Continuation of application No. 09/071,437, May 1, 1998, Pat. No. 5,946,667, which is a continuation of application No. 08/223,797, Apr. 6, 1994, abandoned.

[51] Int. Cl.[7] .................................................. G06F 17/60
[52] U.S. Cl. .................................. 705/36; 705/35; 705/37
[58] Field of Search .................................. 705/35, 36, 37, 705/30, 31, 400; 707/104, 101, 530, 531

[56] References Cited

U.S. PATENT DOCUMENTS

| | | | |
|---|---|---|---|
| 4,674,044 | 6/1987 | Kalmus et al. ........................... | 705/37 |
| 4,677,552 | 6/1987 | Sibley, Jr. ................................ | 705/37 |
| 5,038,284 | 8/1991 | Kramer .................................... | 705/37 |
| 5,101,353 | 3/1992 | Lubien et al. ........................... | 705/37 |
| 5,126,936 | 6/1992 | Champion et al. ...................... | 705/36 |
| 5,132,899 | 7/1992 | Fox .......................................... | 705/36 |
| 5,270,922 | 12/1993 | Higgins .................................... | 705/37 |
| 5,297,032 | 3/1994 | Trojan et al. ............................ | 705/37 |
| 5,644,727 | 7/1997 | Atkins ...................................... | 705/40 |
| 5,682,469 | 10/1997 | Maeda et al. ........................... | 706/46 |

OTHER PUBLICATIONS

Elgin; "SPDR Web Ensnares Both Active, Passive Fund Managers"; *Corporaate Cashflow*; v14 n13; pp. 5–6; Dialog: File 485 Acc# 00440032.

Friedman et al.; "It's a Bond, It's Stock, It's . . . A Lyon?"; *Business Week*; Aug. 6, 1990; p. 66.

Chiappinelli; "Reinventing a Security: Arguments for Public Interest Definition"; *Washington and Lee Law Review*; vol. 49, Sections 957–985 (Summer 1992).

Steiner; "New Amex 'Spiders' Mimic S&P Index"; *The Wall Street Journal*; Feb. 22, 1992.

Wilcox; "EAFE is for Wimps"; *The Journal of Portfolio Management* (Spring 1994), pp. 68–75.

*Primary Examiner*—Stephen R. Tkacs
*Attorney, Agent, or Firm*—Pennie & Edmonds LLP

[57] ABSTRACT

A data processing system and method is disclosed for implementing and control of a financial instrument which is issued for a limited period of time. The instrument is based on an underlying basket of stocks optimally selected to track an established capital market and its price also reflects accrued investment income and maintenance expenses. The data processing system receives input from the capital market and periodically evaluates the performance of the financial instrument, reporting its price to customers. Also disclosed is a data processing system for administering an investment group of such instruments designed to track the performance of several domestic and foreign markets, estimate their return and provide current price information to customers.

21 Claims, 7 Drawing Sheets

INDEX: WSCI JAPAN
(PRICE AS OF __/__/199_)

| SYMBOL | COMPANY | SHARES NUMBER | % OF AVG. DAILY VOLUME | US DOLLARS PRICE | US DOLLARS VALUE | LOCAL CURRENCY PRICE | LOCAL CURRENCY VALUE | VALUE DESCRIP. % OF BASKET | VALUE DESCRIP. % OF INDEX | NORMAL BSK/IND |
|---|---|---|---|---|---|---|---|---|---|---|
| OVERALL TOTALS | | 595,800 | | | 5,115 | | | | | |
| JAPAN | | 595,800 | | | 5,115 | | | 100.00% | 100.00% | |
| BASKET: 215,050 | | | | | | | 643,066 | | | |
| INDEX: 266,152 | | | | | | | | | | |
| 6462842 | INDUSTRIAL BANK OF JAPAN | 8,000 | 2.19% | 23.30 | 186 | 2,930.00 | 23440 | 3.65% | 3.43% | 1.02 |
| 6250241 | DAIICHI KANCYO BANK | 10,000 | 1.77 | 16.70 | 167 | 2,100.00 | 21000 | 3.27 | 3.27 | 0.96 |
| 6356280 | FUJI BANK | 9,000 | 2.01 | 18.21 | 164 | 2,290.00 | 20610 | 3.20 | 3.30 | 0.93 |
| 6598714 | MITSUI TAIYO AOBE BANK | 11,000 | 2.30 | 12.41 | 136 | 1,560.00 | 17160 | 2.67 | 2.58 | 0.99 |
| 9858526 | SUNITOMO BANK | 9,000 | 1.32 | 14.95 | 135 | 1,880.00 | 16920 | 2.63 | 2.94 | 0.86 |
| 6900643 | TOYOTA MOTOR CORP | 11,000 | 0.96 | 11.61 | 128 | 1,460.00 | 16060 | 2.50 | 2.71 | 0.88 |
| 6895404 | TOKYO ELECTRIC POWER | 3,100 | 0.54 | 25.77 | 80 | 3,240.00 | 10044 | 1.56 | 2.16 | 0.69 |
| 6643108 | NOMURA SECURITIES | 6,000 | 0.72 | 12.41 | 74 | 1,560.00 | 9360 | 1.46 | 1.52 | 0.91 |
| 6429104 | HITACHI LTD | 10,000 | 0.43 | 7.38 | 74 | 978.00 | 9280 | 1.44 | 1.52 | 0.91 |
| 6572707 | MATSUSHITA ELECT IND'L | 6,000 | 0.49 | 11.69 | 70 | 1,470.00 | 8820 | 1.37 | 1.53 | 0.86 |
| 6894081 | BANK TOKYO | 6,000 | 1.34 | 11.37 | 68 | 1,430.00 | 8580 | 1.33 | 1.43 | 0.89 |
| 6797173 | SEVEN ELEVEN | 1,000 | 0.96 | 66.41 | 66 | 8,350.00 | 8350 | 1.30 | 1.08 | 1.15 |
| 6483489 | SANSAI ELECTRIC POWER | 3,000 | 0.86 | 21.55 | 65 | 2,710.00 | 8130 | 1.26 | 1.31 | 0.92 |
| 6895341 | TOKAI BANK | 6,000 | 1.97 | 10.74 | 64 | 1,350.00 | 8100 | 1.26 | 1.36 | 0.88 |
| 6642569 | NIPPON STEEL | 20,000 | 0.73 | 2.87 | 57 | 361.00 | 7220 | 1.12 | 1.24 | 0.87 |
| 6499367 | KYOWA SAITANA BANK | 7,000 | 1.74 | 7.94 | 56 | 998.00 | 6986 | 1.09 | 1.15 | 0.90 |
| 6597067 | MITSUBISHI HEAVY | 10,000 | 0.48 | 5.21 | 52 | 655.00 | 6550 | 1.02 | 1.10 | 0.89 |
| 6894708 | TOKYO MARINE & FIRE | 5,000 | 0.65 | 9.54 | 48 | 1,200.00 | 6000 | 0.93 | 0.92 | 0.97 |
| 6596876 | MITSUBISHI TRUST | 4,000 | 1.04 | 11.93 | 48 | 1,500.00 | 6000 | 0.93 | 0.97 | 0.92 |
| 6640400 | NEC | 5,000 | 0.53 | 9.54 | 47 | 1,200.00 | 6000 | 0.93 | 0.92 | 0.97 |
| 6356575 | FUJI PHOTO FILM | 2,000 | 0.32 | 23.70 | 47 | 2,960.00 | 5960 | 0.93 | 0.97 | 0.97 |
| 6596785 | MITSUBISHI CORPORATION | 5,000 | 0.81 | 9.31 | 47 | 1,170.00 | 5850 | 0.91 | 0.76 | 1.17 |
| 6986085 | YASADA TRUST | 4,000 | 2.49 | 11.29 | 45 | 1,420.00 | 5680 | 0.88 | 0.91 | 0.95 |
| 6471071 | JAPAN AIR LINES | 6,000 | 1.13 | 7.52 | 45 | 945.00 | 5670 | 0.88 | 0.78 | 1.08 |
| 6597261 | MITSUI TRUST | 4,000 | 1.94 | 10.98 | 44 | 1,380.00 | 5520 | 0.86 | 0.84 | 1.01 |
| 6493745 | KIRIN BREWERY | 4,000 | 0.61 | 10.34 | 41 | 1,300.00 | 5200 | 0.81 | 0.82 | 1.00 |
| 6642860 | NISSAN MOTOR | 8,000 | 1.16 | 5.15 | 41 | 647.00 | 5176 | 0.80 | 0.68 | 1.13 |
| 6986449 | BANK YOKOHAMA | 4,000 | 0.89 | 9.62 | 38 | 1,210.00 | 4840 | 0.75 | 0.81 | 0.95 |
| 6356945 | FUJITSU LTD | 6,000 | 0.50 | 6.36 | 38 | 800.00 | 4800 | 0.75 | 0.69 | 1.05 |
| 6055708 | ASAHI GLASS | 4,000 | 0.70 | 9.54 | 38 | 1,200.00 | 4800 | 0.75 | 0.72 | 0.99 |
| 6895448 | TOKYO GAS | 9,000 | 0.71 | 4.21 | 37 | 529.00 | 4761 | 0.74 | 0.74 | 1.02 |
| 6661768 | OSAKA GAS | 8,000 | 0.27 | 4.61 | 37 | 580.00 | 4640 | 0.72 | 0.70 | 0.96 |
| 6435145 | HONDA MOTOR | 3,000 | 0.40 | 11.85 | 36 | 1,490.00 | 4470 | 0.70 | 0.73 | 0.94 |
| 6356934 | FANUC | 1,000 | 0.36 | 35.55 | 36 | 4,470.00 | 4470 | 0.69 | 0.53 | 1.25 |
| 6499260 | KYOCERA | 1,000 | 0.40 | 35.31 | 35 | 4,440.00 | 4440 | 0.69 | 0.41 | 1.61 |
| 6821506 | SONY | 1,000 | 0.19 | 34.68 | 35 | 4,360.00 | 4360 | 0.68 | 0.81 | 0.80 |
| 6462944 | ITO YOKADO | 1,000 | 0.30 | 34.20 | 34 | 4,300.00 | 4300 | 0.67 | 0.88 | 0.22 |
| 6640381 | NIPPONDENSU | 3,000 | 1.04 | 11.29 | 34 | 1,420.00 | 4260 | 0.66 | 0.59 | 1.02 |
| 6251448 | DAIWA SECURITIES | 4,000 | 0.77 | 8.43 | 34 | 1,060.00 | 4240 | 0.66 | 0.71 | 0.89 |
| 6800602 | SHARP | 3,000 | 0.30 | 10.90 | 33 | 1,370.00 | 4110 | 0.64 | 0.73 | 0.84 |
| 6858946 | SUMITOMO CORPORATION | 4,000 | 0.55 | 8.11 | 32 | 1,020.00 | 4080 | 0.63 | 0.54 | 1.12 |

FIG. 7

DATA PROCESSING SYSTEM AND METHOD FOR FINANCIAL DEBT INSTRUMENTS

This is a continuation of application Ser. No. 09/071,437, filed on May 1, 1998, now U.S. Pat. No. 5,946,667, which is a continuation of application Ser. No. 08/223,797, filed Apr. 6, 1994, abandoned.

FIELD OF THE INVENTION

The present invention relates to a data processing system and method for managing financial debt instruments designed for investors whose objective is to track the performance of certain security markets within a limited period of time. More particularly, the invention relates to an integrated financial management system for implementing investor participation in domestic and foreign capital markets through positions in indexed vehicles which are packaged as debt instruments.

BACKGROUND OF THE INVENTION

The capital markets of the world have undergone unprecedented transformations during the last decade in response to changing economic, political and financial conditions which have led to closer contacts between the economies of different countries and thus to a largely internationalized capital marketplace. As a result of this global investment environment, traditional investment devices such as stocks and bonds have been supplemented with more versatile investment vehicles. The advent of computerized trading and other forms of advanced information processing has created a new family of investment products, such as commodity options; international capital, real estate, and currency funds; "unmanaged" index funds; financial futures contracts, and other so-called derivative instruments.

In spite of these alternatives, certain investment strategies remain prohibitively expensive to pursue for a number of investors. In particular, many investors employ a technique known as market timing, which involves investing in the equity markets at the perceived time of market growth and divesting at a later time of perceived market contraction. This strategy is usually based on timing the business cycles for the economy as a whole which tends to avoid the risk associated with owning individual stocks. Due to the fact that economic cycles of different countries frequently run in opposite directions, it would be especially beneficial for market timers to participate in a particular capital market for a limited time and to be able to redistribute investments to other markets at appropriate times in the perceived cycles. Despite the globalization of the economic and political ties between different countries, however, there are numerous problems associated with a foreign market trade, so that only a few investment vehicles exist which would allow the investors to participate in the global financial markets at a reasonable cost.

Another investment approach is to seek undervalued stocks. The goal is to counteract the business cycles so that the selected individual stocks, perceived to be undervalued, have an opportunity to appreciate. Such investment approach involves hedging one investment in a perceivably undervalued stock with a countering investment to limit the impact of the business cycle on this stock. Clearly, the investment hedging strategy is best applied on a global scale, which allows the investors to limit their risks. As discussed above, however, such approach is presently not available to most inventors due to the difficulties associated with trading on foreign markets.

Among the various investment options, significant popularity in last years have achieved the mutual funds which offer a variety of investment options tailored to specific customer needs. Different funds are designed to invest in particular types of stocks, in specific industry sectors, or track the performance of broader market indicators. Some funds offer income which is free of federal, state or local taxes, dependent on the residence of the investors. Mutual funds are particularly attractive because they provide the investors with the opportunity to participate in the capital markets for a relatively low fee compared to a direct investment in stocks. These investors' fees are in part used to finance research directed to selecting a specific investment portfolio for each fund.

Recently, professionally managed mutual funds have come under criticism due to the fact that a large number of such funds were outperformed by general equity market indicators, such as the S&P 500 index. The S&P (Standard & Poor's) 500 index is a relative valuation of the stocks of 500 large companies, indicative of the performance of the U.S. equity markets. To some degree, the performance of such funds is determined by the total investments in the fund. Some small funds are capable of focusing on a particular investment strategy which may lead to superior performance over a limited period of time. As the investment return of such funds rises, however, more investors are attracted to the fund, leading to a less flexible investment structure and frequently to a worsened performance. For this reason, many funds are being closed to new investors after they reach certain level of assets.

The unsatisfactory performance of many managed funds has created substantial interest in unmanaged investment products that track the overall performance of the equity markets. Such products include indexed stock funds that invest in the stocks of the S&P 500 companies and, therefore, directly track the performance of the S&P 500 index, unencumbered by asset research fees and transaction costs. Other investment vehicles have been offered to track the performance of select foreign markets.

Several investment products have been proposed in the past in this respect. One approach is represented by the Toronto Index Participation Units ("TIPS"). TIPS is an open end unit trust structure which was designed to follow the Toronto 35 Index.

Another relatively recent approach is offered by the Standard & Poor's Depositary Receipts™ ("SPDRs"). The SPDRs are financial instruments devised to package equity into a single listed security. They represent ownership in a SPDR Trust, a unit investment trust which holds a portfolio of common stocks that tracks the price performance and dividend yield of the S&P 500 Index. SPDRs are like open end unit trust that is rebalanced daily to the S&P 500 Index and may trade at a premium or discount to the S&P 500 futures. SPDRs may be held like a stock for a long time and entitle the holder to quarterly cash distributions corresponding to the dividends that accrue to the S&P stocks in the underlying portfolio, less expenses. While the SPDRs provides desirable diversification and convenience, they are only offered in one capital market.

The above-described investment products do not provide the desired diversity and level of service. Notably missing are investment products which track the performance of one or more foreign markets. At least in part, the reason for this lack of financial products is that no financial management system has been able to combine resources such as computer data processing systems, economic forecasts, market models and a global communication network to enable the creation of such products and provide real time analysis and reports on the performance of the financial product. Furthermore, no financial product on the market has been packaged as a debt instrument which in many jurisdictions provides appreciable tax and other advantages to the investors.

It is therefore felt that there is a need to provide an integrated financial management system for implementing investor participation in domestic and foreign capital markets through positions in indexed vehicles which are packaged as debt instruments. The financial management system is to offer a full range of services including administering, monitoring and reporting on the return of the financial instrument, providing investors with cost effective and versatile options to participate in different capital markets.

SUMMARY OF THE PRESENT INVENTION

It is an object of the present invention to provide a financial management system to develop and administer a financial debt instrument traded as a listed security to investors desiring to track the performance of a domestic or foreign capital market.

Another object of the present invention is to provide a system and method for optimized selection of shares the performance of which is designed to track the performance of the related equity index over a limited period of time.

It is another object of the present invention to provide a data processing system for administering information on each share of a selected basket of shares which is representative of a capital market.

It is a further object of the present invention to provide data processing means for determining a price for a basket of shares which is packaged as a debt instrument so as to reflect the current aggregate value of the shares and accrued income and expenses associated with all shares in the basket.

Yet another object of the present invention is to provide a data processing system and method to rebalance a basket of shares which is representative of a capital market and is designed to track its performance if the tracking error associated with an index value of the capital market exceeds certain threshold.

It is yet another object of the present invention to provide a computer system for maintaining financial debt instruments that represent positions in one or more capital markets and which generates reports on the return of each financial debt instrument to the investors.

These and other objects of the present invention are realized in a specific embodiment of a financial management system incorporating means for implementing, coordinating, supervising, analyzing and reporting upon financial debt instruments designed to track the performance of established capital markets. The financial debt instrument of the present invention comprises a basket of stock shares the return performance of which is representative of a capital market over a predetermined limited period of time. The debt instrument is sold as an Optimal Portfolio Listed Security ("OPALS") which may provide in many jurisdictions tax and other advantages to the investors. The data processing system of the management system of the present invention provides continuous monitoring of the price of the OPALS and reports this price to customers over a communication network.

The basket of shares underlying the debt instrument of the present invention is selected through a mathematical programming function which uses input to forecast of economic and financial variables, risk allocation factors and data about individual stocks in the market. The programming function then suggests a basket of stock shares which are optimally selected to track the investment return of the capital market over a predetermined period of time. Thus, the present invention provides investors with a convenient, cost-effective and mathematically rigorous means of reducing the level of uncertainty about their investment return.

In the preferred embodiment, the financial management system of the present invention packages the optimally selected baskets of shares as debt instruments which are traded as OPALS. The debt instruments are issued in different series which track the performance of domestic or foreign capital markets over different predetermined periods of time. Each OPALS is secured by the shares, or an Equity Linked Obligation ("ELO"), secured by the underlying basket of stock shares which are purchased and held by the financial management system. Upon maturity, the OPALS is redeemable to the investors, or may be rolled over into a new debt instrument, designed to track the same or a different capital market. The period of time for which such OPALS are issued is between about one and ten years, preferably between one and five years, and may vary with the selected capital market or the prevailing economic conditions.

During the life period of an OPALS the data processing system of the present invention provides continuous monitoring of the trade transactions of the stocks represented in the underlying basket of shares. The system combines current trade information with historical data representing financial characteristics of each stock in the basket to generate the current price of each stock at any time. The data processing system uses the financial characteristics, such as the value of the historical, default or minimum spread between ask and bid prices of the stock and its last N trade transaction, to estimate information about trade transactions which have not closed and thus provide an accurate estimate of the price of the stock.

Based on the information on each stock, the data processing system computes the current aggregate value of the basket of shares. This aggregate value is further modified to reflect clearing, custody and other management costs and income accrued from the basket of shares to generate a composite price for the debt instrument which is the listed price at which the OPALS are traded. Because the OPALS are traded as single securities, investors gain exposure to an entire market by making one payment only. Furthermore, the OPALS securities receive book-entry settlement so that an investor willing to sell the security can send one set of instructions to an operator of the financial management system. The OPALS will settle in about five business days after the trade date, regardless of the local market settlement cycle. This is made possible by the pricing model used in administering the OPALS which model is implemented by the data processing system of the present invention.

During the life of the security, the pricing of each OPALS is monitored and analyzed. Based on the analysis, if necessary, an OPALS is then rebalanced to account for differences between the performance of the constituent shares and that of the associated capital market index. The cost of rebalancing is automatically included in the price of the security by the data processing system.

Another aspect of the present invention is that the data processing system, which monitors the performance of the basket of shares underlying an OPALS also provides the capability to generate reports to the investors on the price of the security, on the present and expected return of the investment and other information. Such reports, which may have different levels of details are expressed in both U.S. dollars and the local market currency and are valuable to investors who follow the market cycle and wish to optimize their investment strategy.

From the standpoint of the investors, the OPALS financial debt instrument provided by the financial management system of the present invention is superior to other investment vehicles in that: (1) It provides the capability to implement several global portfolio decisions using a single investment; (2) it provides access to international equity markets on a country by country basis, avoiding problems associated with investor asset restrictions or the inconvenience of trading individual stocks; (3) it is a cost-effective investment with low administration costs for trading and processing shares underlying the debt instrument.

The structure and complexity of the system of the present invention suggests that it would be best implemented on a real time computer system. As described in its preferred embodiment below, the management system and its data processing part provides a real time update of all the components which comprise the OPALS, and supervises, analyses and periodically reports on the investment activities associated with the financial debt instrument.

BRIEF DESCRIPTION OF THE DRAWINGS

The foregoing features of the present invention may be more fully understood from the following detailed disclosure of a specific preferred embodiment in conjunction with the accompanying drawings, in which:

FIG. 7 illustrates the information for a basket of shares which is reported to the system operators.

DETAILED DESCRIPTION OF THE PREFERRED EMBODIMENTS

Discussing briefly in overview the financial management structure of the present invention, its fundamental objective is to facilitate the access of investors to world capital markets by providing and administering a new financial debt instrument that increases the ease and diminishes the cost of investing.

Figure 1:
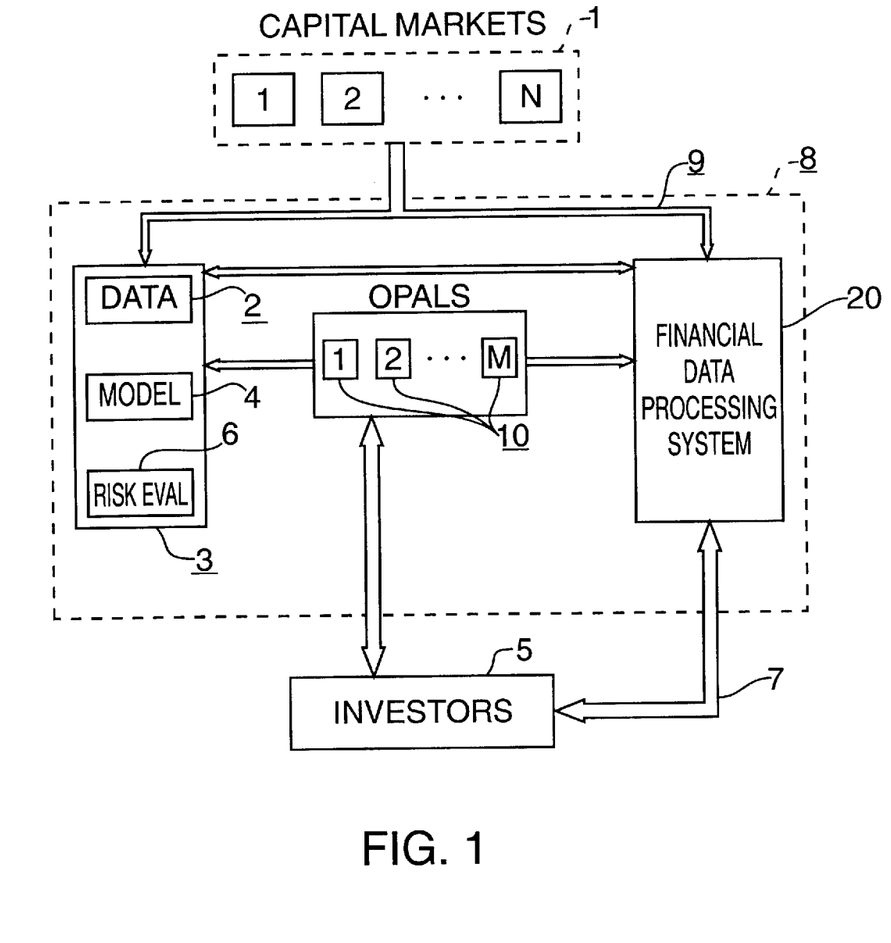
FIG. 1 illustrates in a block diagram form the financial management structure of the present invention and its connections to the capital markets and investors.

The financial management structure of the present invention is operated according to the data processing methods and systems disclosed next. FIG. 1 illustrates in a block diagram form the financial management structure 8 of the present invention which links capital markets 1 and the investors 5, who wish to participate in one or more of these markets. Capital markets 1 may represent the stock market of different countries or an index associated with the performance of such markets. In a preferred embodiment of the present invention financial management structure 8 comprises a modeling system 3, financial debt instruments 10 traded to investors as single securities and a data processing system 20 designed to administer the transactions associated with debt instruments 10.

Modeling system 3 selects an optimized basket of shares which is representative of a particular capital market. This selection is done using a programming function which receives and stores data about each stock in the capital market, correlates the available data with economic forecast models to suggest an optimal basket of stock shares which can model the performance of the overall market, and predicts the future correlation of the selected stocks in the basket with the index of the market to ensure that they will track the market index closely.

Based on the information from the modeling system 3, financial management structure 8 creates one or more financial debt instruments 10 which are designed to be traded as Optimized Portfolio Listed Securities ("OPALS"). Each OPALS 10 is packaged as a financial debt instrument which is characterized in that it can be traded as a single security and, for a limited period of time which is typically between one and five years, tracks a market index associated with the capital market. During their existence term, OPALS 10 generate income to their holders based on the performance of the underlying shares in accordance with a prespecified payment schedule. Such income is comprised of dividends on the shares in the basket of shares underlying each OPALS 10, proceeds from the sale of rights accruing to such shares, and income received from lending such shares. Upon maturity of the OPALS 10, its holder (a participating investor 5) is entitled to receive the entire basket of shares underlying the OPALS.

The OPALS financial instrument 10 operates with respect to investors 5 as an open market fund which can be traded by brokers either at the value of the underlying shares or above or below this value dependent on the current market situation or other factors. OPALS 10 are issued in series which track the performance of one or more capital markets over different predetermined periods of time. An important features of OPALS 10 of the present invention is that each of them is packaged as a debt instrument so that income received on the shares that support the OPALS may be passed to the investors in a tax neutral manner in most jurisdictions. Notably, OPALS 10 are structured so that where permitted they may be traded in a local currency which feature may create additional benefits to the investors.

During the existence term of an OPALS 10, financial management structure 8 fully administers the debt instrument using data processing system 20. Data processing system 20 continuously monitors the price of the underlying basket of shares using input from a global communications network 9 connected to the capital market place. Based on this information, data processing system 20 computes the aggregate value of the entire underlying basket of shares and the current price of the OPALS 10 by further including the accrued income and the appropriate maintenance expenses.

Data processing system 20 additionally reports over communications network 7 to the investors 5 the prices of all issued OPALS which can be traded on request. Furthermore, system 20 provides the capability of trading and settling of the OPALS 10 independent of the local settlement cycles because it uses in the pricing structure of the OPALS a market impact factor which incorporates the characteristics of local trading patterns.

The individual components of the management system 8, their interactions and the advantages offered to the investors are considered in detail next.

The Modeling System

Still in reference to FIG. 1, the optimized basket of shares underlying an OPALS 10 is selected in a preferred embodiment of the present invention by modeling system 3. In order to adequately follow a market index, for small capital markets it may be necessary to purchase shares of all stocks. In larger markets, however, it would be more cost efficient to purchase only a subset of all stocks which subset is representative of the market as a whole. An advantage of this approach is that it avoids the costs associated with the transactions and monitoring on a daily basis of large numbers of stocks. Factors such as capitalization, the industries representation, the liquidity the local shares and others are used in the stock selection process.

This selection is done in accordance with one embodiment of the present invention using a mathematical programming function which employs data means 2 for receiving and storing data about each stock in the capital market; portfolio modeling means 4 which correlate the available data with economic forecast models to suggest an optimal basket of stock shares; and risk evaluation means 6 predicting the future correlation of the selected stocks in the basket with the market valuation. Risk evaluation means 6 employs a multi-factor risk model and relies on optimization techniques to ensure that the subset of stocks underlying an OPALS will track the market index as closely as possible. The cooperation between data means 2, modeling means 4 and risk evaluation means 6 results in a basket of stock shares whose weighing further reflects liquidity considerations, industry exposure and market capitalization.

In a specific embodiment, modeling system 3 determines the optimal basket of stocks by sorting the stocks of the capital market in a descending order of market values and storing the sequence in a computer memory. For each stock of the portfolio, modeling means 4 then computes the associated volatility or beta factor using well known techniques. Modeling means 4 then stores in a memory (not shown) the beta factor of each individual stock. The list of beta values is then added and divided by the number of all beta values to obtain the average beta value for the stocks in the model basket of shares. If the average beta for the basket of shares is greater than unity, the programming function operated by modeling means 4 will review the portfolio and add or substitute stocks with lower beta factors to bring the average to or less than about 1. This selection of substitute stocks can be made by an operator using the optimization software to select the shares to be deleted from or added to the composite of basket of shares to adjust the tracking tolerance.

Another step used in the selection of the model portfolio involves analysis of the capitalization of the stocks in the selected portfolio. Capitalization may be defined as the value obtained by multiplying the total number of outstanding shares of a stock by the current price of the stock. Risk evaluation means 6 computes the capitalization of each stock in the model basket, adds them up and divides the result by the number of stocks in the portfolio to obtain the average model capitalization. Risk evaluation means 6 next determines or obtains from an outside source the average capitalization value for the particular market which is being followed and compares the result to the computed capitalization of the model basket. Should there be a discrepancy between the two values which is above a predetermined threshold, the program implemented by means 6 may be directed to substitute either new stocks from the capital market or change the weighing of the stocks represented in the basket.

Data means 2, modeling means 4 and risk evaluation means 6 may be implemented in a specific embodiment of the present invention as computer processes which are capable of creating and exchanging messages. A separate computer can be provided for each of these processes or they can run on a single multiprocessing system. Modeling system 3 operates in accordance with a mathematical programming optimization function which uses a set of user defined constraints on the current financial reports of the stocks received from the capital markets over communications network 9 and stored in data means 2. Other constraints include the level of certainty regarding future events and the predicted future values of economic variables. Such constraints are typically defined by human experts and are used by the risk evaluation means 6.

The operation of modeling system 3 above is merely illustrative of the considerations used to define an optimal basket of stock shares which represent a capital market over a limited period of time.

Alternatively, modeling system 3 may be implemented using commercially available sources for optimized portfolio selection and risk and investment analysis. Such sources include packages which are available from the Harvard Business School in Cambridge, Mass., or vendors such as Barra International in San Francisco, Real Decisions Corporation in Darien, Conn. and others.

The Data Processing System

Figure 2:
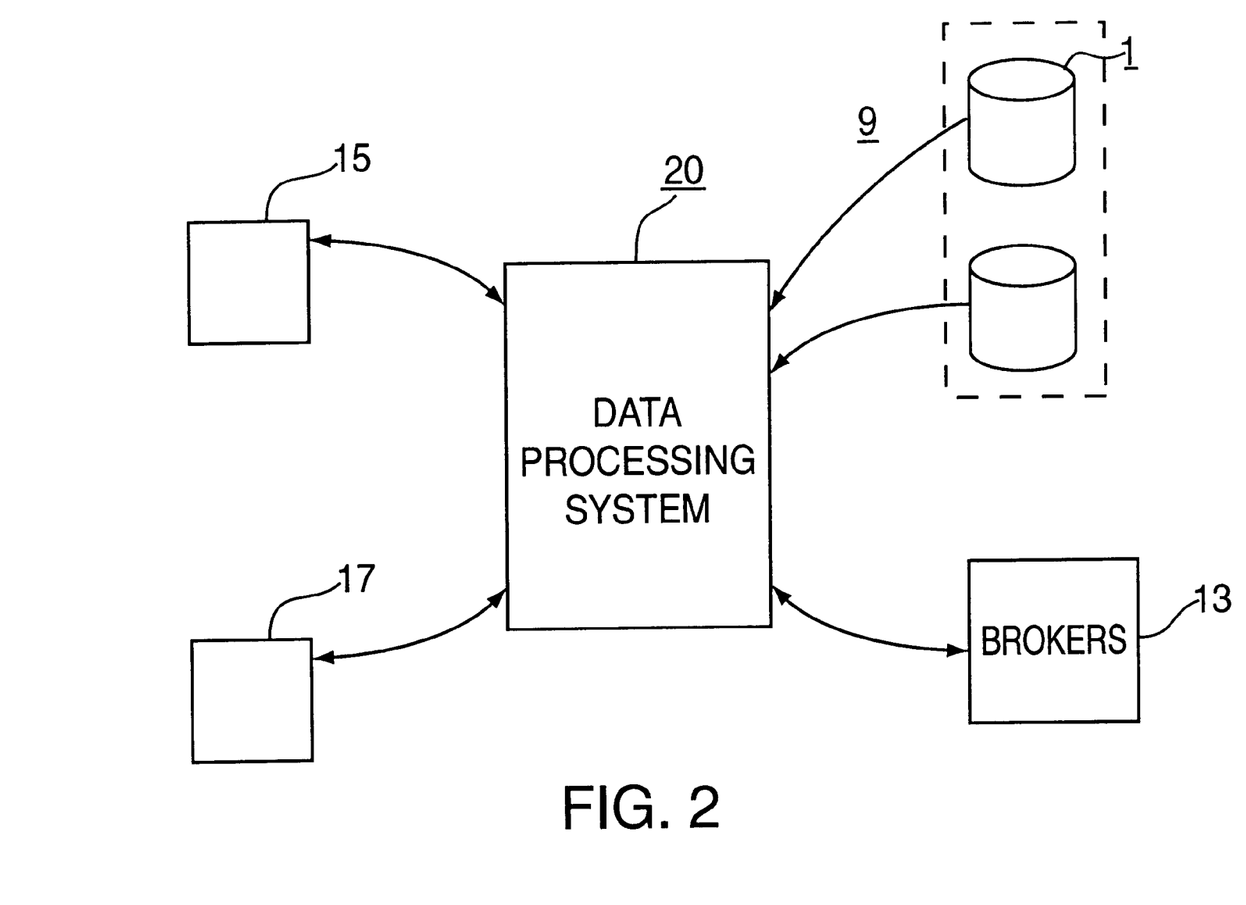
FIG. 2 illustrates in a block diagram form the connections between the data processing system and other components of the financial management structure.

FIG. 2 illustrates in a block diagram form the connections between the data processing system 20 and other components of the financial management structure as well as the communications network proving a link to the capital markets. As shown, data processing system 20 receives input over communications network 9 from the capital markets I and has a two-way connection with brokers 13 which handle trade transactions of the OPALS.

Data processing system 20 is also connected over a communications network to investors 5. In a preferred embodiment of the present invention this communication may be established over an international news report service 15 such as Reuters. Additionally, all trade transactions and other information concerning the basket of stock shares underlying the OPALS are communicated on-line to desktop terminals 17 of the operators of the financial management structure 8. Terminals 17 further receive information about the current price of all OPALS which are administered by the management structure 8.

Figure 3:
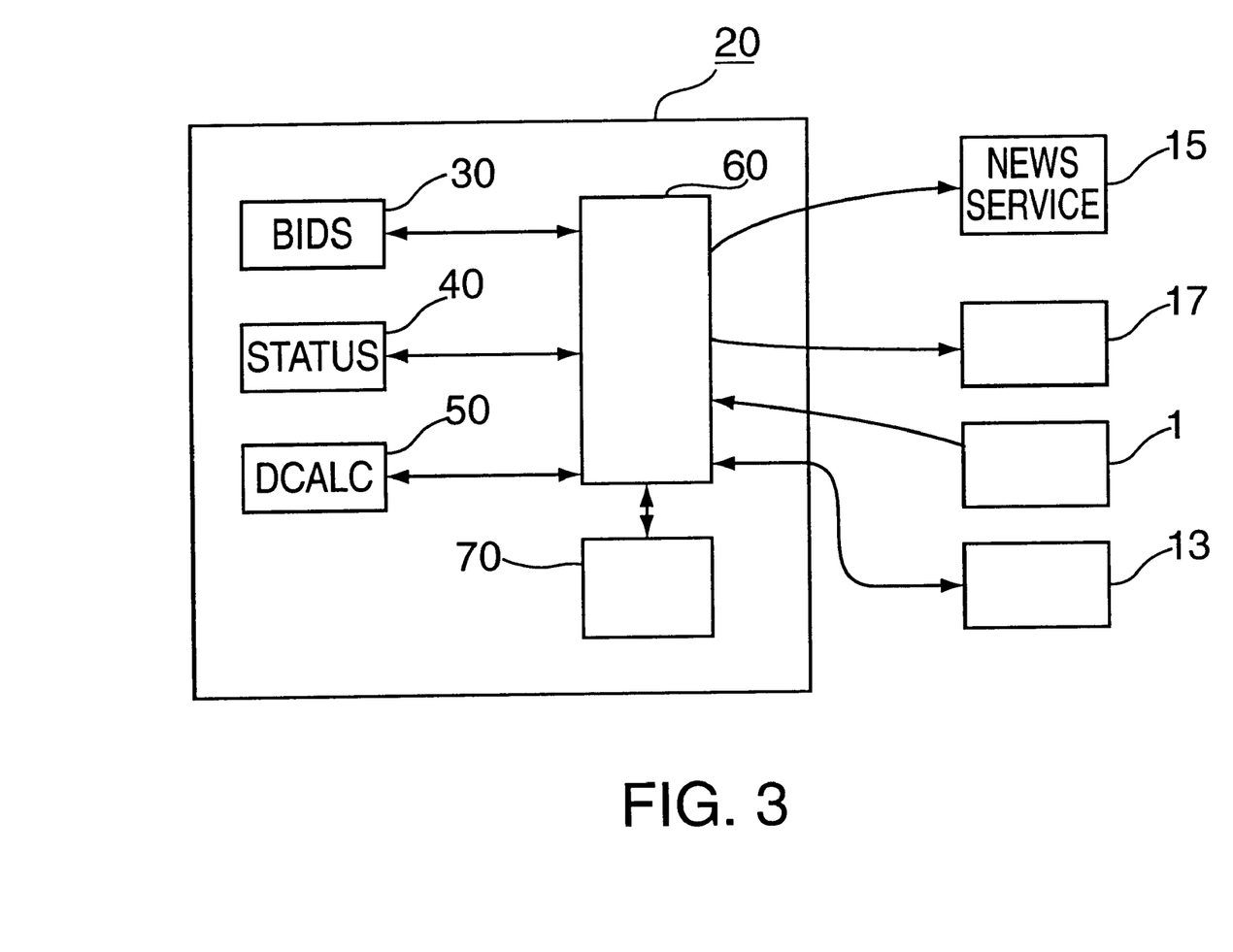
FIG. 3 shows in more detail the structure of the data processing system.

FIG. 3 shows in more detail the structure of the data processing system 20 which is designed in accordance with the present invention to administer an OPALS debt instrument. In a preferred embodiment illustrated in FIG. 3, data processing system 20 comprises a processor unit 60, database 70 which stores data about the basket of shares underlying the OPALS and three computer applications: 30 called bids, 40—called status, and 50—termed dcalc. The applications 30, 40 and 50 interact with processor 60 to compute the current price of the OPALS. As shown in FIG. 3, data processing system 20 also receives input from the capital markets which input comprises raw transactions data for each stock.

Based on the information from the capital market, application 30 first computes the aggregate ask, bid and trade prices for the stocks underlying the OPALS. Next, application 40 receiving input from application 30 computes the overall value of the basket of shares which includes the sum total of all ask prices and the sum total of the bid and trade prices. Finally application 50, receiving input from both applications 30 and 40, adds to the aggregate value of all shares the accrued income and maintenance costs to determine the overall price of the OPALS as traded to the investors.

In addition to the dynamic values which are reported on-line to the data processing system from the capital market there are static variables which are used to determine the final prices for the OPALS. Such static values include finance charges and commission rates as well as the historical and default spread values between the ask and bid prices for the stocks of the underlying basket. These static values are computed and periodically updated using an OPALS maintenance facility (not shown) which is part of processor 60 and stores data in data base 70.

In a preferred embodiment of the invention, applications 30, 40 and 50 of data processing system 20 are processes running on workstations which are interconnected by a local area network to a computer file server 60. A specific advantage of this configuration is the relatively low cost of implementation.

In another preferred embodiment of the present invention, data processing system 20 can be implemented on any computer capable of multiprocessing, or multitasking where the individual processes can be synchronized and can exchange messages while running. Examples include general purpose "time-slice" minicomputers and mainframes, symmetrical multiprocessor computers, and multiprocessor and single-processor transaction processing computers.

The data processing system 20 of the present invention may also be implemented using several architectures which differ in the interconnections between the process components and the exchange of information between them. Specifically, processor 60 may be connected, either directly or through a data communications gateway, to a host computer, which in turn may connect directly to operator terminals. In this embodiment the terminals 17 of the operators may be connected to both the host and to processor 60, so that an operator may have access to all running processes.

Computation of the Price of an OPALS

The operation of data processing system 20 is best understood by considering the interaction of applications 30, 40 and 50, processor 60 and database 70. Due to the fact that information about a large numbers of stocks from different capital markets must be processed simultaneously, each stock of each OPALS being administered by the data processing system must be uniquely identified to enable such interaction. The identification of each security has a specific system description which is stored in database memory 70 and may appear as follows:

INDEX=MSCI ID=AMBGN E=FRA CNTRY=GFR CURR=DEM

RIC=GDAX REX=IDN QUAN=50.0 DQUAN=50.0 where:

| TABLE OF INPUT INDICES | |
|---|---|
| INDEX | which market index this basket is following |
| ID | The stock identifier. |
| E | The exchange code identifier. |
| CNTRY | The country code. This code maps to the spread file where the specific spreads are assigned to specific countries. |
| CURR | The local trade currency. |
| RIC | The symbol identifier for the select index. |
| REX | The exchange identifier for the select index. |
| QUAN | The quantity of the particular stock in the basket. |
| DQUAN | The default quantity of the particular stock in the basket. |

Additionally, data processing system 20 comprises a set of configuration files which are stored in database 70 and comprise various static variables used by the applications. Examples include the default spread and the historical spread files, in which for each country an exchange identifier is associated with the default and historical spread factors for the ask and bid prices of each stock.

Figure 4:
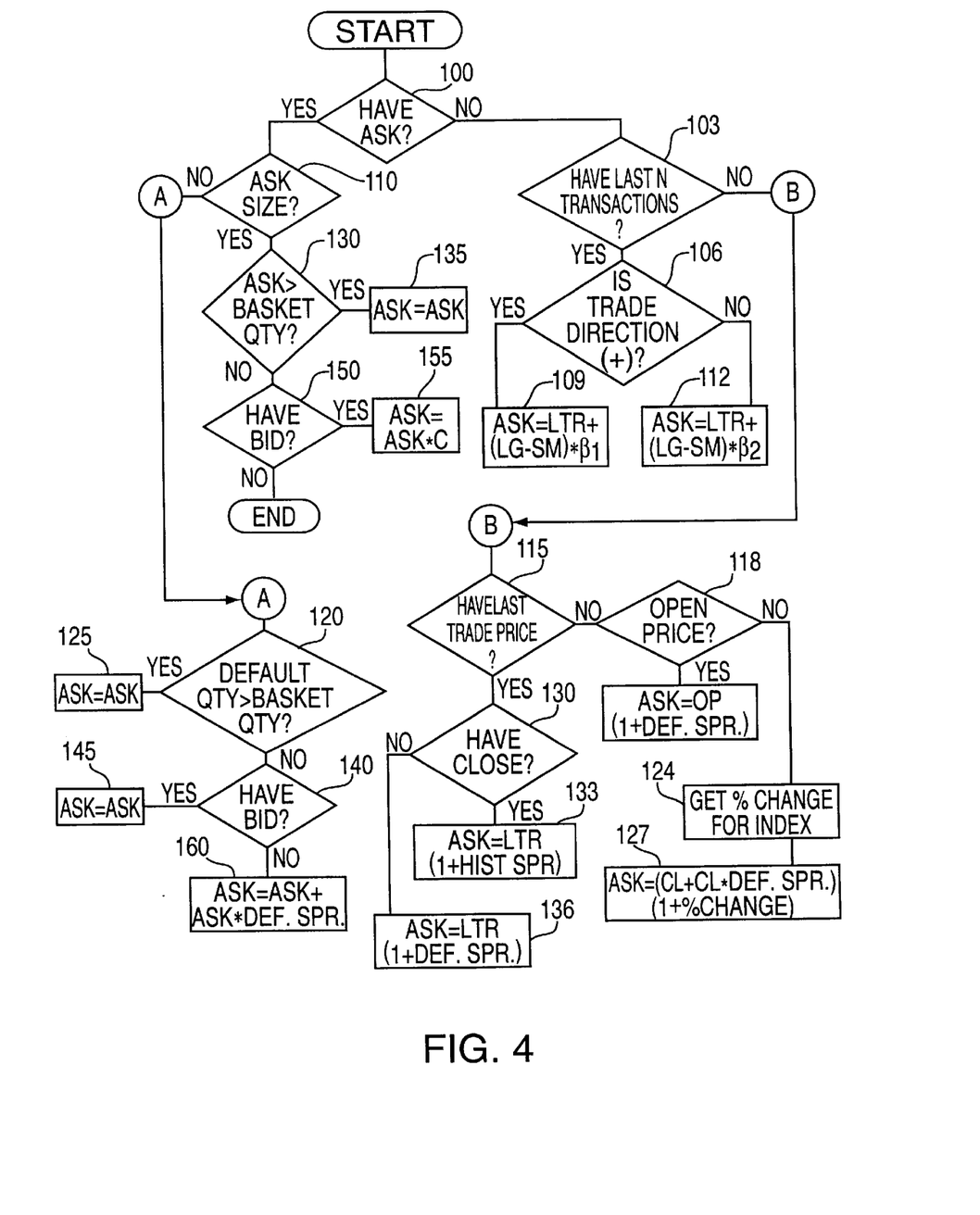
FIG. 4 is a flow chart of the computation of the current ask price for each stock in the basket.
Figure 5:
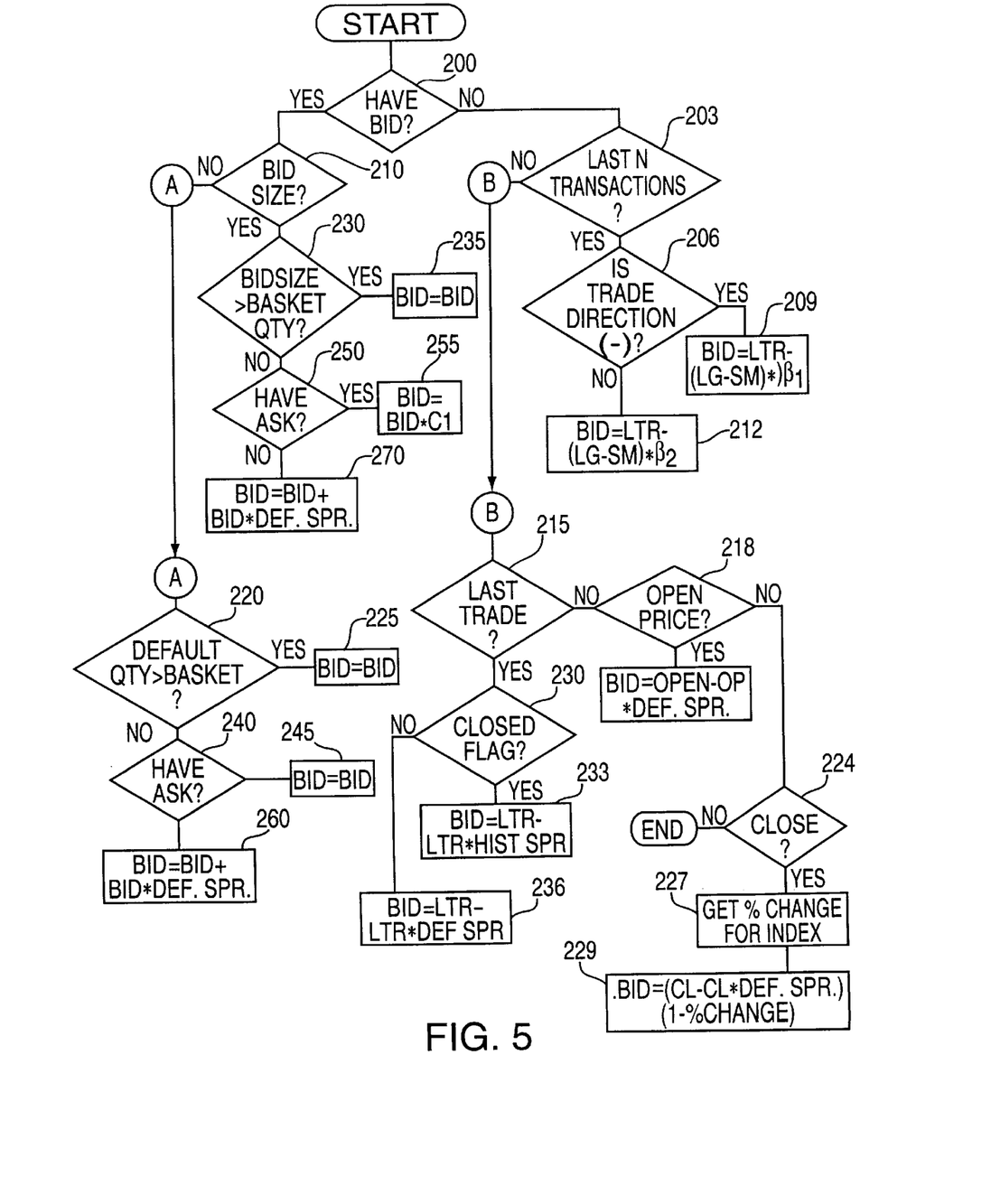
FIG. 5 is a flow chart of the computation of the current bid price for each stock in the basket.
Figure 6:
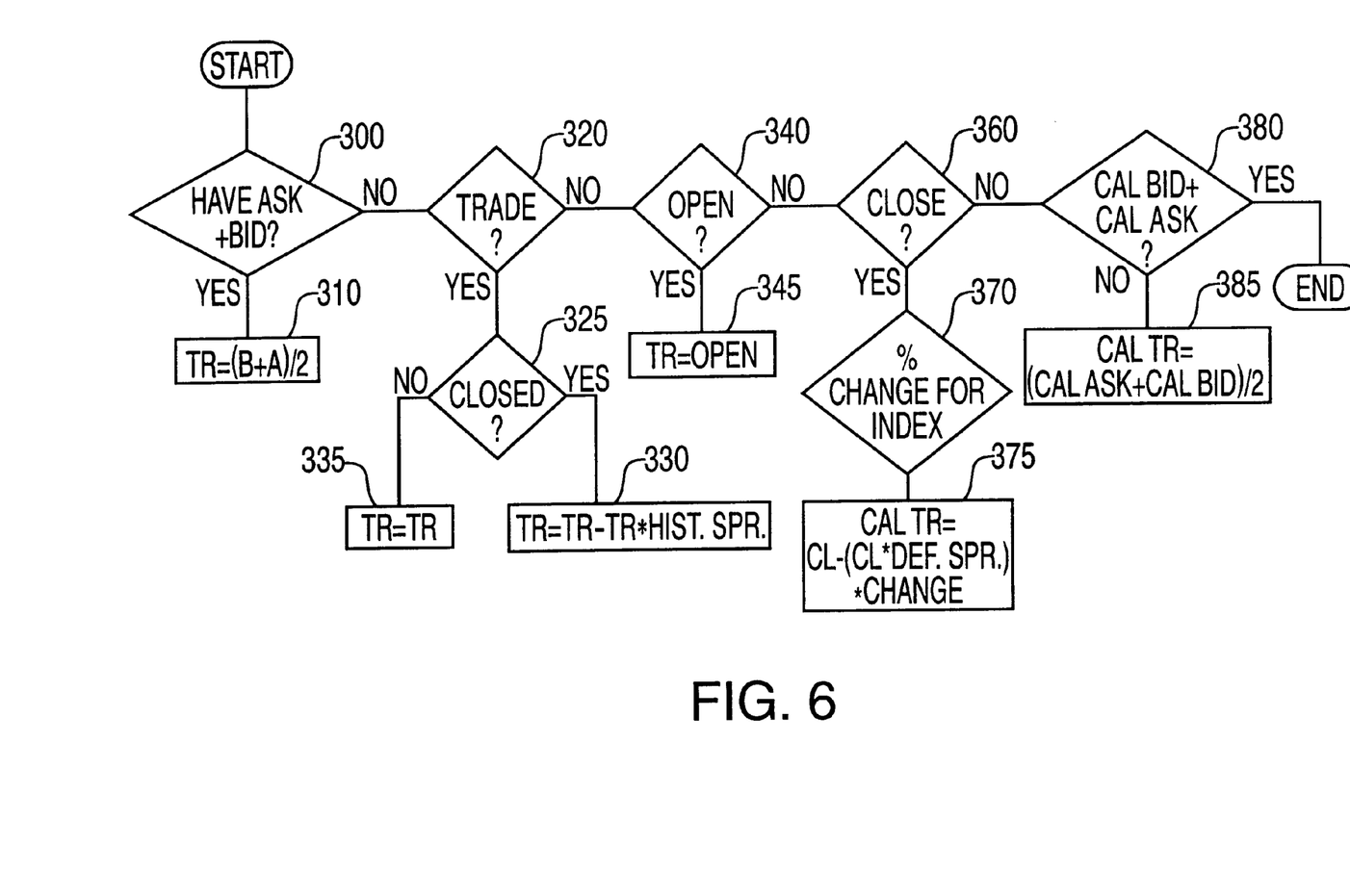
FIG. 6 is a flow chart of the computation of the current trade price for each stock in the basket.

FIGS. 4–6 are flowcharts which illustrate the program steps executed by application 30 (bids) to calculate the ask, bid and trade prices for each stock in a basket of shares underlying an OPALS. These individual stock prices are made available to processor 60 and database 70 for subsequent use.

Specifically, FIG. 4 illustrates the instruction sequence executed by application 30 to compute the ask parameter for a particular stock. (To avoid confusion with the ask prices in the capital market which are posted on the communications network, the value computed by the processing system 20 is termed an ask parameter in the sequel). In step 100 the program checks whether there is an ask price posted on the communications network and if there is such price the program proceeds to step 110 to check whether there is an ask size specified. If such ask size is specified, application 30 proceeds to step 130 in which it computes whether the ask size is greater than the basket quantity of the stock. If the ask size is greater than the basket quantity, the next step is 135 where the value of the ask parameter for the stock is set equal to the market ask price. If the ask size is less than the basket quantity, the algorithm proceeds to step 150 where it checks whether there is a bid posted on the communications network. If there is such bid posted, in step 155 the value of the ask parameter is set equal to the posted ask price multiplied by a constant C which is close to but greater than 1.

If in step 110 there is no ask size posted, the algorithm proceeds to step 120 where it is checked whether the stock default quantity is greater than the basket quantity. The default quantity is a static parameter which is entered by the operators of the data processing system for each capital market, and is stored in database 70. If the check result is positive, the program assigns in step 125 the ask parameter equal to the posted ask price. If the check result is negative, the algorithm proceeds to step 140 to check whether a bid price has been posted on the communications network. If there is a bid price posted, in step 145 the ask parameter is set equal to the market ask price. If there is no bid posted, in step 160 the ask parameter is set equal to ask price plus a multiple of this price which is determined by the default spread value for the stock which is stored in the default spread file discussed above.

If in step 100 there is no ask price for the stock, the algorithm proceeds to step 103 where it is checked whether the system contains in its database data on the last trade transactions of the stock. If the system does have such record, it checks the trade direction (the sign of the trade difference) during the last transactions at step 106. If the trade direction during the last transaction is positive, the ask parameter is set in step 109 to equal the last transaction price plus the difference between the largest transaction minus the smallest transaction, multiplied by a coefficient beta1. If the last trade direction is negative, the ask parameter is set in step 112 equal to the last transaction price plus the difference between the largest and smallest ask prices in these last transactions, multiplied by a coefficient beta2. The values of the beta coefficients in steps 109 and 112 of the method are preferably in the range of about 0.05 to 0.07 for beta1 and about 0.03 to 0.05 for beta2.

If there is no record of the last N trade transactions, application 30 proceeds to step 115 which determines whether the last trade price is available. If this price is available, at step 130 it is determined whether the trade was closed, which condition is indicated by a closed flag posted on the network. If the transaction is closed, in step 133 the ask parameter is set equal to the price in the last transaction plus the last transaction price multiplied by the historical spread value, which is stored in the historical spread file, also discussed above.

If the last transaction was not closed in step 136 the ask parameter is set equal to the last transaction price plus the same price multiplied by the default spread value which contained in the default spread file. If there is no record of the last transaction price, in step 118 application 30 checks whether there is an open price available. (An open price refers to a price for a transaction which is not closed). If such price is posted, in step 121 the ask parameter is set equal to the open price times the open price multiplied by the default spread value.

If there is no open price available at the time, in step 124 is received the percent change for the associated index. In this case the ask parameter for the stock is calculated to be equal to the last close price plus the same price multiplied by the default spread value, multiplied by a coefficient equal to unity plus the percent change of the market index at step 127.

Finally, if there is no ask, size, bid, trade price or close information for a particular stock, application 30 does not calculate an ask parameter.

The instruction sequence above is an example of the type of situations in which, according to the method and data processing system of the present invention different static parameters may be used.

FIG. 5 shows an analogous flowchart which illustrates the computation of the bid parameter for each stock in the basket. The bid parameter is computed first by checking in step 200 whether there is a bid price posted on the communications network. If there is such price, in step 210 application 30 checks whether there is a bid size posted. If a bid size is posted, in step 230 this size is compared to the basket quantity for the particular stock and if it is determined to be greater than the basket quantity, in step 235 the bid parameter for the stock is set equal to the posted bid price.

If in step 230 the bid size is less than the basket quantity, in step 250 application 30 checks whether there is an ask price posted and if there is such price, in step 255 the value of the bid parameter is set equal to the bid price multiplied by a coefficient C which is close to but less than 1. If there is no ask price posted, the value of the bid parameter is set in step 270 equal to the posted bid price plus the same price multiplied by the default spread which is determined for the stock from the corresponding value in the default spread file.

If next in step 210 it is determined that there is no bid size posted, in step 220 it is checked whether the default quantity of the stock is greater than the quantity which is in the basket. If the result of the test is positive, the value of the bid parameter is set in step 225 equal to the posted bid price. If the default quantity is less than the basket quantity, in step 240 application 30 checks whether there is a posted ask price.

If such price is posted, in step 225 the value of the bid parameter is set equal to the bid price. If there is no ask price posted, then the bid parameter is set in step 260 to be equal to the bid price plus the same price multiplied by the default spread value for the stock.

Returning back to step 200, if it is determined that there is no bid price posted, then in step 203 the system checks whether it has a record of the last N transactions of the stock.

If such record is available, in step 206 it is determined whether the trade direction during the last transaction is negative, in which case the value of the bid parameter is set in step 209 to the last trade price minus the difference between the biggest and smallest trade prices, multiplied by a coefficient beta1. If the trade direction is positive, then in step 212 the value of the bid parameter is set equal to the last transaction minus the difference between the biggest and smallest transaction prices, multiplied by a coefficient beta2. Coefficients beta1 and beta2 are stored in data base 70 and preferably have values between about 0.05 to 0.07 for coefficient beta1, and about 0.03 to 0.05 for coefficient beta2.

If in step 203 it is determined that there is no record of the last N transactions for the particular stock, in step 215 application 30 checks whether there is a record of the last trade price. If such record exists, in step 230 it is determined whether the transaction was closed, as indicated by a close flag posted on the network. If the transaction is closed, in step 233 the value of the bid parameter is set equal to the last transaction price minus the last transaction price multiplied by the historical spread value for the stock. If the transaction is not closed, in step 236 the value of the bid parameter is set equal to the last transaction price minus the same price multiplied by the default spread value. Both the default and the historical spread values for each particular market index and individual stock are contained in the configuration files in data base 70.

Going back to step 218, if it is determined that there is no open price available, in step 224 application 30 checks whether there is a close price posted, and in step 227 if there is such price the application 30 requests the percent change for the associated index. The value of the bid parameter is set equal to the close price minus the close price multiplied by the default spread value, multiplied by a coefficient equal to 1 minus the percent change value in step 229. As in the case of the computation of the ask parameter, if there are no bid, size, ask, trade or close prices, no value for the bid parameter is computed or sent to processor 60.

Finally, the computation of the trade prices is illustrated in FIG. 6. In step 300 it is determined whether a bid and ask prices for a particular stock are available and if the result of the test is positive, the value of the trade price is set in step 310 equal to the average of the bid and ask prices. If there are no bid and ask prices simultaneously posted, in step 320 it is determined whether there is a trade price. If there is a trade price posted, application 30 checks in step 325 whether the trade was closed. In step 330 the trade price is determined to be equal to the trade price minus the trade price multiplied by the historical spread value. Otherwise, in step 335 the trade parameter is set equal to the trade price. If there is no trade price posted for the particular stock, in step 340 application 30 checks whether there is an open price posted. If there is such price posted, in step 345 the value of the trade parameter is set equal to the open price.

If there is no open price posted in step 360 application 30 checks whether there is a close price posted and if the result of the test is positive, in step 370 application 30 computes the percent change for the associated index. In step 375 the value of the trade parameter is then set equal to the close price minus the close price multiplied by the default spread value and multiplied by the value of the percent change. If in step 360 there is no close price posted, in step 380 it is checked whether the system has calculated bid and ask prices as computed in FIGS. 4 and 5. If such values are computed in step 385 the value of the trade parameter is set equal to the calculated bid price plus the calculated ask price divided by two.

Once the bid and ask prices are calculated, application 30 checks whether the spread between the two values is above the minimum spread value for the stock which value is contained in the default spread file. In case the calculated difference is less than the minimum spread value, application 30 widens the difference by changing both the bid and ask parameter values so that the minimum spread for a particular stock is covered.

Application 30 communicates the computed values of the ask, bid and trade parameters to application 40 (status). As explained above, application status maintains a running total of all bid, ask trade prices, along with the number of stocks which are opened within each basket at a particular time. For each basket of shares, application 40 creates four status configuration files. The first created file is associated with the sum total of all ask prices; the second file contains the sum total of all bid prices; the third file contains a sum total of all trade prices divided by a normalization constant which depends on the round lot size at which the OPALS are normally traded (typically about 10,000); and the last configuration file contains the number of open stocks in the basket. The values computed by application 40 are referred to as the aggregate ask, bid and trade values for the basket of shares underlying an OPALS. These aggregate values do not include any income from the shares of the basket or maintenance or custody charges incurred.

Application 50 (Dcalc) receives the aggregate values which are communicated to processor 60 by the status application 40 and completes the computation of the OPALS price by applying various commissions and custody charges to the overall value of the financial instrument. The values which are calculated and communicated by application 50 are the final prices that are communicated to the investors and the communications networks.

An example of the calculated values on output of application 50 for a specific capital market is illustrated as follows:

| 32 | ap  | 4266881.50 |
|----|-----|------------|
| 16 | bp  | 4246657.00 |
| 18 | tp  | 425.64     |
| 26 | pc  | 0.00       |
| 22 | cb  | 0.07       |
| 41 | bf  | 424.9      |
| 24 | af  | 428.3      |
| 8  | bdf | 261.35     |
| 9  | afd | 263.52     |
| 1  | tfd | 261.8      | where the first column indicates the number of real time records available for the calculation and the remaining entries are defines as follows:

| | |
|---|---|
| ap | Aggregate ask normalized to one record |
| bp | Aggregate bid normalized to one record |
| tp | Aggregate trade normalized to one record |
| pc | Percent change between the cumulative clearance price and current tp. |
| cp | Clearance basis = (clearance/aggregate bid)* 10000 |
| bf | Bid Final = aggregate bid − clearance − (aggregate bid * broker) + dividend + bid finance + (aggregate bid * commission) + (aggregate bid * bid spread) |
| af | Ask Final = aggregate ask + clearance + (aggregate ask * broker) + dividend + ask finance + (aggregate ask * commission) + (aggregate ask * custody) + (aggregate ask * ask spread). |
| bfd | Bid Final Dollar = Bid Final/exchange rate. |
| afd | Ask Final Dollar + Ask Final/exchange rate. |
| tfd | Trade Final Dollar = Ask Final/exchange rate |

The "clearance" entry above refers to the transaction costs to process the settlement of the shares in the specific market by the agent.

As illustrated above, application 50 adds to the aggregate value of the basket of shares underlying the OPALS various correction factors which reflect income and expenses associated with the debt instrument. Such correction factors include the local market settlement costs, the accrued income on the OPALS, fail financing costs and others, as modified by a market impact factor.

Specifically, application 50 will reflect one or more of the following income components into the price of the OPALS.

A. cash dividends received on the shares in the underlying basket.
B. cash dividends that are past the payable date on the underlying shares, but have not yet been received.
C. the net present value of cash dividends that are past the record date on the underlying shares, but have not yet reached the payable date.
D. in certain markets the net present value of dividends that are passed or at ex date on the underlying shares, but have not reached the record date. This number may be adjusted to reflect ex date dividends that are doubtful of receipt.
E. net interest earned on the cash income received on the shares.
F. stock loan income earned on the underlying shares.
G. stock dividends sold for cash.
H. cash proceeds from the sale of rights.
I. cash proceeds from the sale of japanese odd-lots.
J. cash proceeds from optional dividends.
K. withholding tax reclaims received by the corporate issue.
L. the net present value of tax reclaims due by the tax issue but not yet received.

Expenses which are deducted from the income stream earned on the OPALS include for example:

A. the wholesale income safe-keeping chaters accruing to the underlying basket of shares.
B. third party charters billed to the financial management structure for processing the collection of income derived from the underlying basket of shares.

In another aspect of the present invention data processing system 20 maintains various static variables which are used in computing the price of the baskets of shares underlying the OPALS debt instruments. The maintenance facility (not shown) is implemented by the data processing system 20 and comprises storage means for storing in accordance with a predetermined protocol one or more of the following parameters: a basket identifier; dividends applied; finance charges on the ask side; the clearance costs in the market; the broker fees on the ask side; the spread value on the ask side; the commission to be applied; the finance charges on the bide side; the custody charges to be applied; the broker fees on the bid side; the spread value on the bid side; and the series number and outstanding shares.

During operation, these values are accessed by application 50 and are used to compute the price of the OPALS. The stored values may be periodically modified by an operator of the financial management structure to more closely reflect the current and expected trading patterns in the capital market.

The price of the OPALS can be rebalanced if necessary to more closely track the performance of the relevant capital market index. Rebalancing is effected by the data processing system 20 which compares the investment performance of the OPALS to the index associated with the capital market to evaluate a tracking error for the debt instrument. If the evaluated error is larger than a predetermined threshold, data processing system 20 can suggest a rebalanced portfolio to improve tracking to the related index. On the basis of the evaluated error and the suggested portfolio, in a preferred embodiment of the present invention, management structure 8 initiates rebalancing of the debt instrument by modifying the composition of the underlying basket of shares.

In one embodiment of the present invention rebalancing will occurs when the tolerance to the annual tracking error, as defined in the OPALS pricing definition, is exceeded. No additional contributions are required from the investors because the rebalancing costs are reflected as change in the price of the OPALS.

The data processing system 20 of the present invention further provides the capability to generate and distribute information about the OPALS to potential and participating investors. Due to the fact that each stock of each OPALS has an unique identifier, it is possible to obtain complete information about all OPALS issued and administered by the management structure 8. To this end, a system user enters the desired basket identifier into one of the terminals 17 connected to the data processing system 20 of the present invention. All information which is associated with the particular basket identifier can then be retrieved and communicated to the corresponding terminal. Such information comprises the current trading activities of the selected basket of shares underlying the OPALS, as well as other relevant information.

Relevant information for a basket of shares appears on the terminals 17 in a format illustrated in FIG. 7. The user may actually overwrite these values by typing over them and, using an update command typed from the terminal, may send the newly corrected values to the processor 60 for recalculation.

Referring back to FIG. 3, the real time prices of the OPALS are broadcast to customers in the form of investors reports. Such reports may completely characterize the OPALS or represent only select information of interest. Investors may call the OPALS trading operator for dealing prices on the OPALS. The prices will be distributed in both U.S. dollars and the local currency of the capital market.

As discussed above, the OPALS financial instruments of the present invention are traded as debt securities so that an investment in an OPALS may result in a different tax treatment from that of a direct investment in equities for some investors. The tax treatment may depend upon the inventors' country and/or their specific tax profile. Dependent on the jurisdiction, the OPALS are preferably structured to be tax neutral.

The redemption of each OPALS occurs in accordance with a periodic payment schedule during three business days after the record date. Holders of round lot OPALS may at this time instruct the financial managing structure to redeem their OPALS and will receive the underlying shares. The shares will be delivered to the holder as soon as local equity market cycles and conditions permit.

The finance management structure can periodically issue new series of OPALS for each equity index, if investors of a minimum predetermined amount of maturing OPALS are interested in purchasing the new series, or sufficient interest among new investors is present. The new series will be available for trading five business days prior to the maturity date of the old OPALS. The investor may elect to invest in new OPALS series which track either the same or a different capital market index. At maturity, the OPALS can also be sold for cash in a secondary OPALS market.

The financial management structure 8 operating in accordance with the present inventions provides the infrastructure necessary to issue and administer the OPALS debt instruments 10. This infrastructure creates a buffer between the volatility of the capital markets 1 and the participating investors 5 which feature provides a number of advantages. Such advantages include the fact that the management structure 8 is principle to the settlement risks associated with each local equity market; the fact that various corporate business structures are involved in the design and cost structure of the financial instrument, so that the administrative costs associated with the OPALS are minimized. Still further advantages include the delivery of on-going administrative services from the data processing system. Other advantages include the consolidation of the income flow into scheduled income distributions which permit investment managers to formulate investment decisions to match such predictable cash flows.

An important advantage from the investors point of view is that all costs associated with participation in foreign markets are bundled up into a single security which may be traded in an open market or may be exchanged for cash in the secondary market. As discussed above, investors are periodically provided with reports of the status of their OPALS and, during redemption dates or at the maturity of the product, are entitled to receive the entire basket of shares which underlies their OPALS.

The OPALS financial instrument may thus be useful to investors 5 for various reasons such as the fact that many investors do not have the back office capabilities to process foreign trades themselves; they may not wish to establish global custody relationships or to develop market-specific analytical expertise. Additionally, some investors may be subject to legal restrictions that prevent them from purchasing futures outside their home markets; others may wish to enter markets where no futures or index linked products exist. The OPALS financial debt instrument is the answer for these investors.

The above described preferred embodiment of the system of the present invention is merely illustrative of the principles of this invention. Numerous modifications and adaptations thereof will be readily apparent to those skilled in the art without departing from the spirit and scope of the present invention which is defined in the following claims.

What is claimed is:

1. A data processing system for administering a financial instrument which provides, within a predetermined limited period of time, a return commensurate with an established capital market, the system comprising:

computer means for selecting one or more securities the return performance of which is representative of a valuation of the capital market over the limited period of time;

means for generating a basket of shares of said one or more selected securities, said basket of shares defining the financial instrument;

data entry means for receiving information on each of said one or more selected securities of the financial instrument;

data processing means responsive to the information from the data entry means for determining a price for the financial instrument so as to reflect the current aggregate value of the basket of shares and income and expenses associated therewith; and output means for communicating said price to users.

2. The system of claim 1, wherein the data processing means comprises:

means for storing data associated with financial characteristics of each of said one or more selected securities;

first means for computing for shares of each of said one or more selected securities the current ask price, bid price and trade price based upon information from the data entry means and the stored data associated with said financial characteristics of said one or more selected securities;

second means receiving input from the first means for determining the current aggregate ask prices, bid prices and trade prices for the basket of shares; and means for computing the current price for the debt instrument receiving input from the second means, wherein the price of the debt instrument corresponds to the computed aggregate prices, and further includes income accrued from the basket of shares and management and trade settlement expenses associated with the basket of shares.

3. The system of claim 1 wherein the limited period of time is longer than one year.

4. In a combination, a data processing system for administering an investment group of financial instruments issued in series on a periodic basis, each series comprising at least one instrument and providing, within a predetermined limited period of time, a return commensurate with one of a select group of established capital markets, each series of instruments being structured to provide investment advantages to a class of potential customers, the data processing system comprising:

computer means for selecting one or more securities corresponding to each capital market in said select group, the return performance of such selected one or more securities being representative of a valuation of the corresponding capital market in said select group over the predetermined limited period of time;

computer means for generating a basket of shares of said one or more selected securities corresponding to each capital market, said basket of shares defining a financial instrument for the corresponding capital market;

means for determining the price to be charged for financial instruments in each series, wherein such price is based upon factors comprising the current trading value of the underlying basket of shares; data concerning the expected income and dividend distributions for the underlying basket of shares; the capital market settlement costs; and a market impact factor which reflects the expected trading patterns for the capital market within the predetermined period of time;

data entry means for receiving information on each of said one or more selected securities in each capital market of the select group of capital markets;

data processing means responsive to the information from the data entry means for determining a price for the instruments in each series so as to reflect the current aggregate value of the basket of shares and income and expenses associated therewith; and output means for communicating said price for each series to users.

5. The system of claim 4 further comprising means for evaluating an expected investment return for the selected basket of shares in each series of instruments over the limited period of time.

6. The system of claim 4 further comprising:

means for monitoring trade transactions associated with each basket of shares to record the investment performance of the instruments in each series; and means for reporting to customers a summary of the recorded investment performance of the instruments in each series.

7. The system of claim 6 further comprising:

means for comparing the investment performance of the instruments in each series to the index associated with the corresponding capital market to evaluate a tracking error for the instrument; and means for rebalancing the instruments in each series.

8. The system of claim 4 wherein the data entry means receives input from a global communication network for reporting the trade transactions of each of said one or more selected securities in each of the select group of capital markets.

9. The data processing system of claim 4 wherein the data processing means further comprises means for storing a record of the last N transactions of each of said one or more selected securities in each basket of shares in the investment group.

10. The data processing system of claim 4 wherein the predetermined limited period of time between at least two series of debt instruments is different.

11. The data processing system of claim 4 wherein the predetermined period of time is longer than one year.

12. A computer-based data processing method for administering a financial instrument which provides, within a predetermined limited period of time, a return commensurate with an established capital market, the method comprising the steps of:

selecting a basket of shares of one or more securities the return performance of which is representative of the returns of the capital market over the limited period of time;

generating a basket of shares of said one or more selected securities, said basket of shares defining the financial instrument;

receiving trade information on shares of said one or more securities of the selected basket of shares; and determining a price for the instrument in response to the received information so as to reflect the current aggregate value of the basket of shares and income and expenses associated therewith.

13. The data processing method of claim 12 wherein the step of selecting comprises the steps of:

designating a set of constraints on the current financial reports on securities in the capital market;

designating a level of certainty regarding future events;

designating predicted future values of economic variables; and executing a mathematical programming optimization function using the designated set of constraints on the current financial reports on the securities, level of certainty regarding future events and predicted future values of economic variables.

14. The method of claim 12 further comprising the steps of:

comparing the investment performance of the instrument to an index associated with the capital market to evaluate a tracking error for the instrument; and rebalancing the instrument if the evaluated error is larger than a predetermined threshold.

15. The method of claim 12 wherein the step of receiving further comprises the steps of:
   storing in a computer memory of records comprising first type of data associated with each security in the basket;
   receiving and storing records comprising second type of data associated with each security in the basket;
   merging the first type of data with the received second type of data into a composite record for each security in the basket.

16. The method of claim 12 wherein the step of determining further comprises the steps of:
   combining the composite records for each security into a global record for the basket of shares of securities, the global record reflecting the current aggregate value of the basket of shares of securities and income and expenses associated therewith; and
   generating a report containing information from the global record.

17. The method of claim 16 wherein the generated report for each financial debt instrument is determined in both U.S. currency and the local currency of the capital market.

18. The method of claim 16 wherein the generated report for each financial instrument comprises a list of the share holdings arranged in a descending order of market value.

19. A data processing system for providing to investors a computer generated information on the current price of at least one financial instrument, such instrument the price of which is based upon the value of an underlying preselected basket of securities in an existing capital market, the system comprising:
   means for storing in a computer memory of records comprising first type of data associated with each security in the basket;
   means for receiving and storing records comprising second type of data associated with each security in the basket;
   means for merging the first type of data with the received second type of data into a composite record for each security in the basket;
   means for combining the composite records for each security into a global record for the basket of securities, the global record reflecting the current aggregate value of the basket of security shares and income and expenses associated therewith; and
   means for generating and communicating to the investors a report containing information from the global record.

20. The system of claim 19 further comprising means for updating the records comprising the first type of data.

21. The system of claim 20 wherein the means for updating receive input which is determined on the basis of information in the received second type of data.

* * * * *